(12) United States Patent
Leiter et al.

(10) Patent No.: US 8,662,276 B2
(45) Date of Patent: Mar. 4, 2014

(54) BRAKING APPARATUS FOR A VEHICLE AND VEHICLE COMPRISING SAID BRAKING APPARATUS

(75) Inventors: Ralf Leiter, Mendig (DE); Roberto Gianone, Barengo (IT); Marco Fratelli, Vigevano (IT); Marco Bassi, Milanese (IT); Chiara Cesari, Novara (IT); Fabio Santinato, Novara (IT); Clemente Magnago, Trecate (IT); Jon Honig, Bloomfield, MI (US); Karthik Kayyar, Rochester Hills, MI (US); Juchirl Park, Troy, MI (US); Cesare Bonfa, Pernate (IT)

(73) Assignee: Meritor Technology, LLC, Troy, MI (US)

( * ) Notice: Subject to any disclaimer, the term of this patent is extended or adjusted under 35 U.S.C. 154(b) by 288 days.

(21) Appl. No.: 13/288,086

(22) Filed: Nov. 3, 2011

(65) Prior Publication Data
US 2012/0111691 A1    May 10, 2012

(30) Foreign Application Priority Data

Nov. 3, 2010   (GB) .................................. 1018520.5

(51) Int. Cl.
*B60T 10/02*   (2006.01)
*F16H 57/04*   (2010.01)

(52) U.S. Cl.
USPC ............. 192/216; 192/218; 188/271; 74/467; 475/160

(58) Field of Classification Search
USPC .......................................... 192/216; 188/271
See application file for complete search history.

(56) References Cited

U.S. PATENT DOCUMENTS

| | | | | |
|---|---|---|---|---|
| 3,334,711 A | * | 8/1967 | Anderson | 188/271 |
| 4,946,014 A | * | 8/1990 | Okada | 192/216 |
| 5,031,738 A | * | 7/1991 | Okada | 475/248 |
| 5,351,794 A | | 10/1994 | Deutzer | |
| 5,351,795 A | * | 10/1994 | Dadel et al. | 477/96 |

(Continued)

FOREIGN PATENT DOCUMENTS

| | | |
|---|---|---|
| EP | 2270365 A1 | 1/2011 |
| GB | 2109488 A | 6/1983 |
| JP | 2010048286 A | 8/2008 |

OTHER PUBLICATIONS

GB Search Report dated Feb. 24, 2011.

(Continued)

*Primary Examiner* — Richard M. Lorence
(74) *Attorney, Agent, or Firm* — Brooks Kushman P.C.

(57) ABSTRACT

A braking apparatus for a vehicle, in particular a heavy goods vehicle, includes a drive axle having a transmission gear, such as a differential, around which an amount of oil for lubrication is variable. The brake apparatus further includes at least one friction brake and at least one retarder that is capable of operating to slow the vehicle through the transmission gear. The braking apparatus comprises a brake operating device for operating the at least one friction brake and the least one retarder, and a determining feature to determine an oil level around the transmission gear. The brake operating device, on operation by a user, is arranged to apply the retarder when the oil level around the transmission gear is above a threshold level, and, if the oil level is below the threshold level, the brake operating device is arranged to initiate an increase in the oil level around the transmission gear.

14 Claims, 2 Drawing Sheets

(56) References Cited

U.S. PATENT DOCUMENTS

2007/0026983 A1     2/2007   Shimizu
2010/0332089 A1*   12/2010   Gianone et al. ................ 701/51
2011/0000332 A1*    1/2011   Gianone et al. ................ 74/607

OTHER PUBLICATIONS

GB Search Report dated Oct. 19, 2011.
Second GB Search Report dated Oct. 19, 2011.

* cited by examiner

BRAKING APPARATUS FOR A VEHICLE AND VEHICLE COMPRISING SAID BRAKING APPARATUS

RELATED APPLICATION

This application claims priority to GB Patent Application No. 1018520.5, filed Nov. 3, 2010.

TECHNICAL FIELD

The present invention relates to a braking apparatus for a vehicle and a vehicle comprising said braking apparatus, in particular a vehicle including a rear axle having a transmission gear around which the amount of oil for lubrication is variable.

BACKGROUND OF THE INVENTION

One form of a known braking system is the use of friction brakes at the wheels of a vehicle. However, in some instances, for example in the case of a large truck attempting to decelerate while going downhill, friction brakes alone may not be enough to provide the required deceleration. In particular, friction brakes may suffer from "brake fade" in which the braking force which the friction brakes are capable of applying decreases as result of repeated or prolonged use, often as a result of heat build up. A known solution to this problem is to provide the vehicle with a retarder, which operates to slow the vehicle through the transmission, and which can be used in addition to, or instead of, friction brakes. Examples of retarders include an engine brake, compression release brake, exhaust brake, hydraulic retarder, and electric retarder (using electromagnetic induction).

It is known to integrate control of the retarder in the brake pedal of a vehicle. It is also known that operation of the brake pedal by a user leads to using the retarder predominantly, with use of the friction brakes occurring only for occasional heavy braking. This minimizes wear on the brakes, and reduces the likelihood of "brake fade" by reducing the instances and application time of the friction brakes.

However, use of a retarder introduces torque into the transmission which can cause wear of the crown wheel and pinion, and wear of the differential.

SUMMARY OF THE INVENTION

A braking apparatus for a vehicle includes a drive axle having a transmission gear around which an amount of oil for lubrication is variable, at least one friction brake, and at least one retarder that is capable of operating to slow the vehicle through the transmission gear.

In one example, the braking apparatus comprises a brake operating device for operating the at least one friction brake and the least one retarder. The brake operating device, on operation by a user, is arranged to apply the at least one retarder when an oil level around the transmission gear is above a threshold level. Further, if the oil level is below the threshold level, the brake operating device is arranged to initiate an increase in the oil level around the transmission gear.

As the brake operating device is arranged to initiate an increase in the oil level around the transmission gear if the oil level low, and as the brake operating device is arranged to not apply the retarder until the oil level around the transmission gear is high enough, use of the retarder when there is insufficient oil around the transmission gear is avoided. Therefore, wear of the transmission gear is reduced. If the oil level is already high enough when the brake operating device is operated by a user, then the retarder can be applied immediately. Therefore, the retarder can be used instead of the friction brakes, thus reducing wear on the friction brakes, and reducing the likelihood of "brake fade".

In another example, the brake operating device is operable by a user to generate a desired vehicle deceleration. If the vehicle speed is above a threshold speed and a degree of vehicle deceleration desired is below a threshold degree, the brake operating device is arranged to apply the at least one retarder if the an oil level around the transmission gear is above a threshold level. The brake operating device is arranged to apply only the at least one friction brake if the oil level around the transmission gear is below the threshold level.

Thus, when the vehicle is travelling at relatively high speed and the brakes are applied relatively lightly, then under certain conditions (oil level around the transmission gear is high) the retarder is applied and under certain other conditions (oil level around the transmission gear is low) then only the friction brakes are applied. This minimizes damage to the transmission gear when the oil level around the transmission gear is low, but also reduces wear on the friction brakes when the oil level around the transmission gear is high.

If the oil level around the transmission gear is below the threshold level, the brake operating device may be further arranged to initiate an increase in the oil level around the transmission gear, and, when the oil level around the transmission gear is above the threshold level, the brake operating device is arranged to apply the at least one retarder. As the oil level is increased, the retarder can be applied in preference to the friction brake, and consequently wear of the friction brakes is further reduced.

In another example, if a degree of desired vehicle deceleration generated by the user is below a threshold degree, the brake operating device is arranged to initiate an increase in the oil level in the transmission gear on the brake operating device being operated by the user, and is further arranged to delay operation of the at least one retarder by a predetermined amount of time. As the brake operating device is arranged to initiate an increase in the oil level around the transmission gear, and as the brake operating device is arranged to delay operation of the retarder until a threshold time after operation of the brake operating device, the oil level around the transmission gear will always increase prior to the retarder being applied (unless it was already at a maximum level before the brake operating device was applied). Therefore, this aspect of the invention reduces wear of the transmission gear compared with a system in which the retarder is applied immediately that the brake operating device is operated by a user.

Preferably, the brake operating device is arranged to initiate an increase in the oil level around the transmission gear on the brake operation device being operated by a user only if the oil level around the transmission gear is below the threshold level. Therefore, unnecessary increases in the oil level, when the oil level is already sufficiently high, are avoided.

The braking apparatus may comprise a reservoir for storing oil, the reservoir being fluidly connected to the drive axle by a valve. The positioning of the reservoir in relation to the drive axle is such that, on opening of the valve, oil can flow from the reservoir into the drive axle under the influence of gravity, thereby increasing the oil level around the transmission gear. The oil level in the rear axle can therefore be increased in a simple manner.

The oil may be transferred to the reservoir by collecting the oil as it is spun off the transmission gear, or by collecting the oil that is splashed around in the drive axle by arranging suitable collectors such as funnels.

Alternatively, the braking apparatus may further comprise a reservoir for storing oil, the reservoir being fluidly connected to the drive axle via a pump. The pump is arranged to pump oil from the reservoir to the drive axle on activation by the brake operating device, thereby increasing the oil level around the transmission gear. The pump may be used to pump some oil from the drive axle to the reservoir when it is not required in the drive axle.

The braking apparatus of the third aspect may further comprise a determining feature to determine the oil level around the transmission gear. Therefore, it can be ensured that the threshold level is reached, and although the retarder may operate before this point, wear of the transmission gear is still reduced as the oil level will have started to rise before the retarder applied. The determining feature to determine oil level around the transmission gear may be a sensor. Alternatively, the determining feature to determine oil level around the transmission gear may be a model.

The braking apparatus preferably further includes a defining feature that defines the threshold oil level. The threshold oil level is dependent on at least one of instantaneous torque being transmitted by the transmission gear, inclination of vehicle, history of the oil, oil temperature, air temperature, vehicle weight, total mileage of axle parts, and number of oil level cycles. Therefore, the oil level can be optimized depending on the condition of the vehicle, i.e. torque to be applied, inclination of vehicle, and the condition of the oil, e.g. oil history, oil temperature.

Preferably, the brake operating device includes an input to be used by a user to input a desired vehicle deceleration. In one example, the input is a brake pedal. Use of a single pedal to operate both the friction brakes and the retarder is simple for the user.

The transmission gear is preferably one of the group comprising a crown wheel, a crown wheel pinion, and a differential gear. In another example, a vehicle includes a drive axle configured to drive a pair of laterally spaced wheels. The drive axle has a transmission gear around which an amount of oil for lubrication is variable. The vehicle further includes at least one friction brake for each wheel, and at least one retarder that is capable of operating to slow the vehicle through the transmission gear. The a braking apparatus vehicle also includes a braking apparatus as described above.

BRIEF DESCRIPTION OF THE DRAWINGS

Two embodiments of the invention will now be described, with reference to the figures, in which.

DETAILED DESCRIPTION

Figure 1:
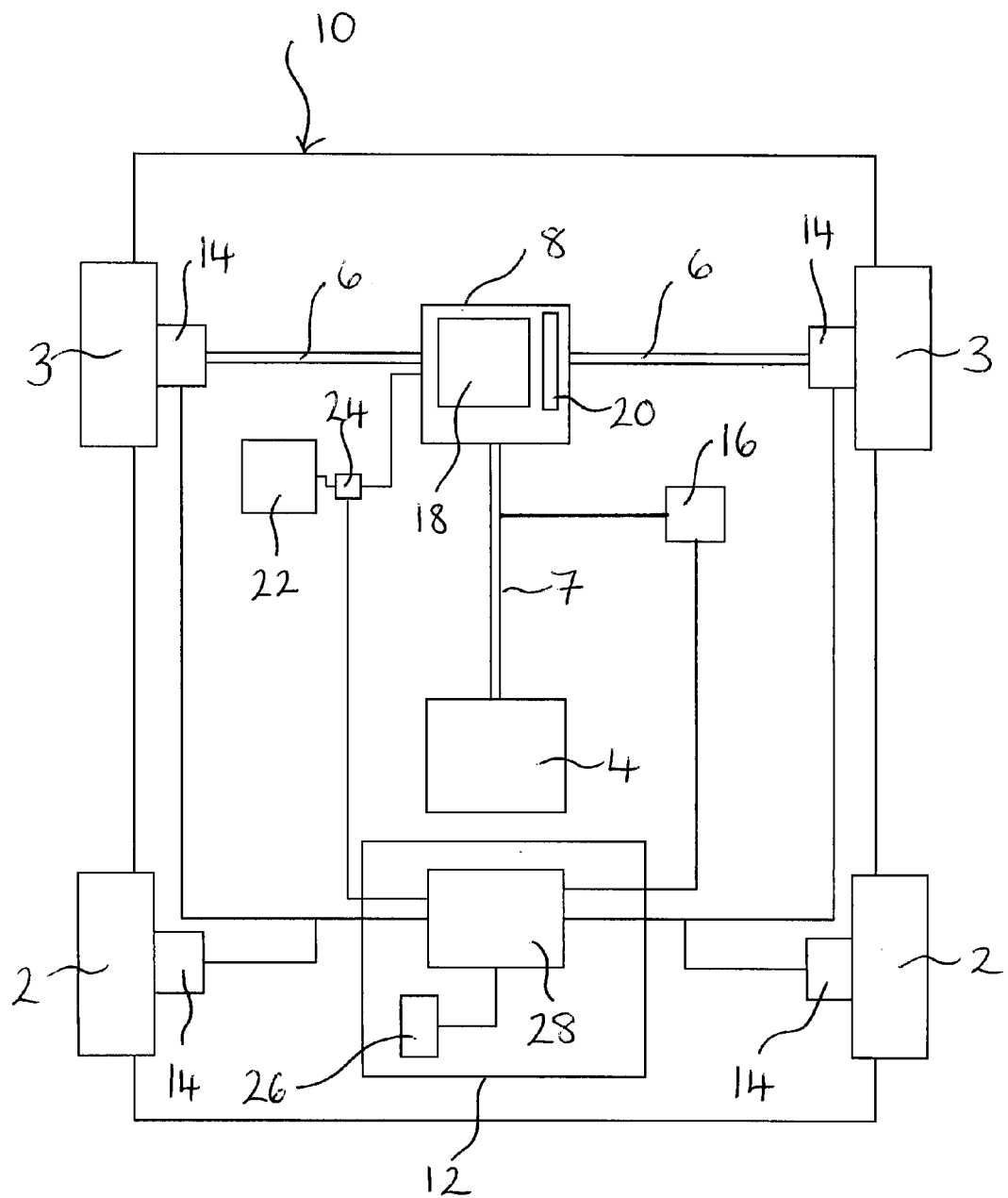
FIG. 1 is a schematic representation of a first embodiment of a braking apparatus, in a vehicle, according to the invention.

In the first embodiment, a vehicle 10 includes two front wheels 2, two rear wheels 3, and an engine 4. The two rear wheels 3 are linked by a rear axle 6, the rear axle 6 being a drive axle. The rear axle 6 includes a transmission 8 to transmit power from the engine 4 to the wheels 3. The engine 4 is connected to the transmission 8 via a drive shaft also known as a prop shaft 7. The transmission 8 includes a differential 18. The rear axle 6 includes oil for lubricating the gears of the transmission 8, including the differential 18, and a sensor 20 is provided in the rear axle 6 to determine oil level around the differential 18. The oil level around the differential 18 can be varied, and the rear axle 6 is fluidly connected to a reservoir 22, via a pump 24. The pump 24 can be used to pump oil from the reservoir 22 to the rear axle 6, and from the rear axle 6 to the reservoir 22. In use, the oil level in the rear axle 6 is generally minimized in situations in which the torque applied to the gears of the transmission 8 is not high enough to result in excessive wear of the transmission gears, as a high oil level will lead to oil churning losses in the transmission 8. The reservoir 22 is used to store excess oil when it is not needed in the rear axle 6. The vehicle 10 further includes a brake operating device 12, four friction brakes 14, one associated with each wheel 2, 3, and a retarder 16.

The retarder may be an engine brake, a compression release brake, an exhaust brake, a hydraulic retarder, an electric retarder, or any other type of known retarder. The retarder operates to slow the rear wheels 3 via the transmission 8, and in particular via the differential 18.

The brake operating device 12 includes an input, such as a brake pedal 26, which can be depressed by a user to input the desired vehicle deceleration. The brake operating device 12 also includes a processor 28. The processor 28 determines which type of braking (friction braking or retarder braking) should be applied when the brake pedal 26 is depressed. The processor 28 can determine the vehicle instantaneous speed. The processor 28 can also determine a degree of deceleration requested by the user, typically as signified by how hard the brake pedal 26 is depressed.

In use, the user depresses the brake pedal to input a desired degree of deceleration into the processor 28 of the brake operating device 12.

If the vehicle speed is relatively low (i.e. below the threshold speed) and the degree of deceleration requested is also relatively low (i.e. below the threshold degree), then only the friction brakes 14 are applied (since some types of retarder work less efficiently at low speed).

If the vehicle speed is relatively high (i.e. above the threshold speed) and the degree of deceleration requested is relatively low (i.e. below the threshold degree), then the retarder 16 may be applied depending on the oil level around the differential 18 in comparison to a threshold level. The threshold level is the level of oil which will provide a sufficient level of lubrication for the differential 18. The oil level around the differential 18 is determined by the sensor 20, which is in communication with the processor 28.

If it is determined that the oil level is sufficiently high (i.e. the oil level is above the threshold level), then the retarder 16 is applied. However, if the oil level is not high enough (i.e. it is below the threshold level), then the friction brakes 14 are applied, and the processor 28 initiates an increase in the oil level around the differential 18 by starting the pumping of oil from the reservoir 22 to the rear axle 6 using the pump 24. As soon as the oil level is above the threshold level, the type of braking occurring will be switched from friction brake braking to retarder braking. Therefore, it is ensured that, the retarder 16 is not applied until a sufficient oil level is present around the differential 18. Therefore, wear of the differential 18 is reduced.

If, while the retarder 16 above is being applied, there is an increase in the degree of deceleration requested by the user (e.g. the brake pedal is pressed harder), the friction brakes 14 will be applied in addition to the retarder 16. Further, if during braking using the retarder 16 alone, the vehicle speed becomes low (i.e. it drops below the threshold speed), the retarder 16 will cease to be applied and the friction brakes 14 will be applied.

In all cases, where there is a change in braking type, i.e. from friction brakes 14 only to retarder 16 only, or retarder 16 only to retarder 16 plus friction brakes 14, or retarder 16 only to friction brakes 14 only, the change occurs in a blended way, such that the user does not notice the change. For example, on changing from friction brakes 14 to retarder 16 when the profile of deceleration with respect to time is viewed, there would be no sudden changes resulting from the change in braking type used, but rather the profile would be smooth, whether the deceleration is increasing, constant, or decreasing.

If the degree of desired deceleration increased to a heavy braking situation (i.e. to above the threshold degree), e.g. during an emergency braking situation then both the friction brakes 14 and the retarder 16 will be applied, irrespective of the type of brakes currently being applied, so that the vehicle 10 can be stopped in the minimum amount of time.

Figure 2:
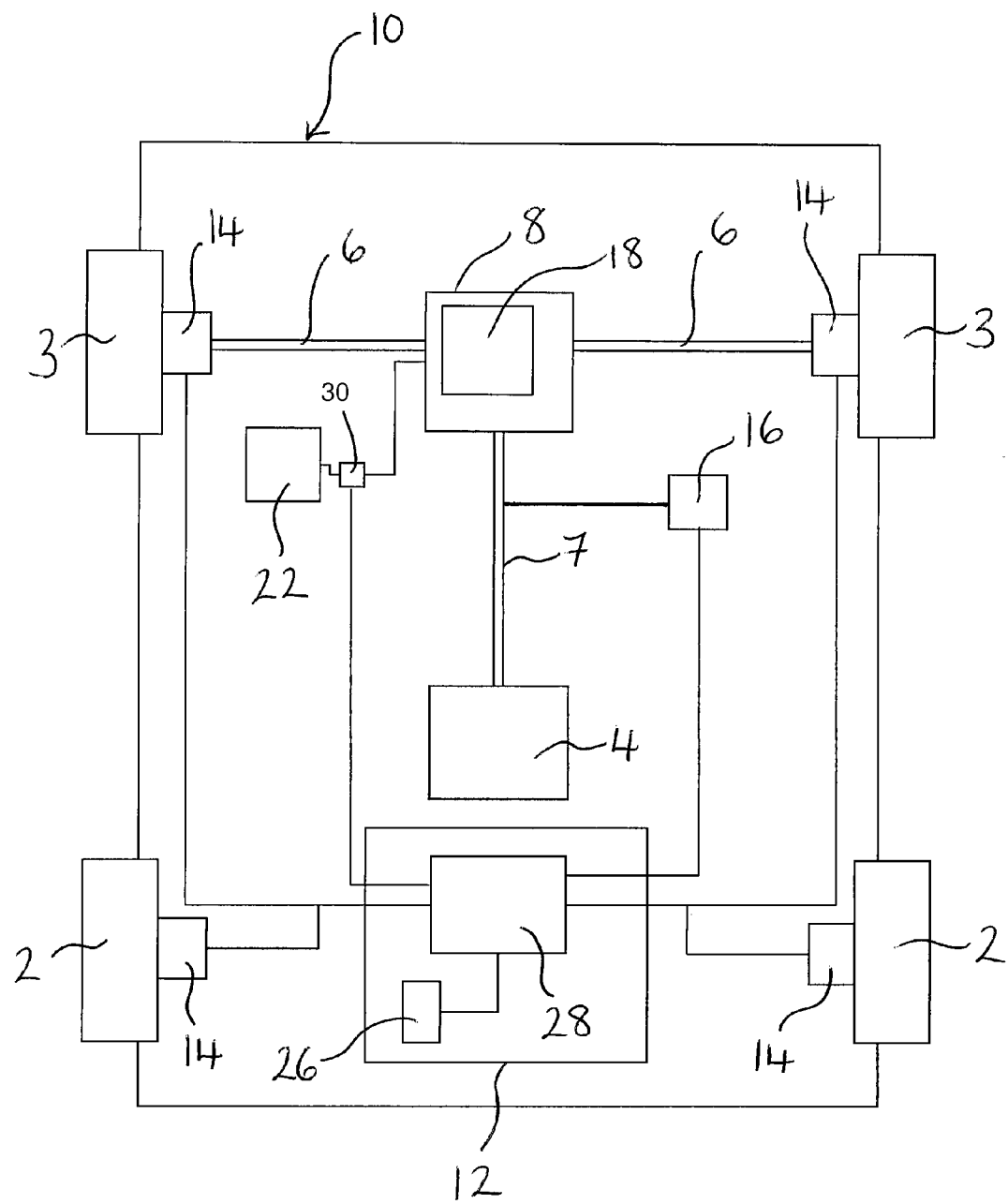
FIG. 2 is a schematic representation of a second embodiment of a braking apparatus, in a vehicle, according to the invention.

The second embodiment is shown in FIG. 2. The second embodiment is similar to the first embodiment, and so only the differences will be described and the same reference numerals will be used for similar features.

The differential 18 does not include a sensor. There is no pump but, instead, there is a valve 30 which, when open, allows fluid to flow from the reservoir 22 to the rear axle 6. The reservoir 22 is positioned such that, when the valve 30 is open, oil can flow from the reservoir 22 to the rear axle 6 under the influence of gravity. Further, the arrangement of the reservoir 22 and rear axle 6 is such that, if the valve 30 between them is open to allow free flow of oil, the equilibrium level of the oil which results provides an oil level around the differential 18 which is capable of providing sufficient lubrication for the differential 18 on use of the retarder 16.

In use, when a user depresses the brake pedal 26, the friction brakes 14 are applied initially. At the same time, the valve 30 is opened so that, if the oil level in the differential 18 is not already at a suitable level to provide sufficient lubrication for the differential 18 on use of the retarder 16, the level of the oil in the reservoir 22 and the rear axle 6 can be allowed to find its equilibrium level, thus resulting in an increase in the oil level around the differential 18. The retarder 16 is automatically applied by the brake operating device 12 after a set delay, for example, a delay of 5 seconds.

Therefore, once the retarder 16 is applied, the oil level around the differential 18 will typically be higher than when the user initially depressed the brake pedal 26. Therefore, wear of the differential 18 will be reduced, compared with situations in which the retarder 16 is immediately applied.

In both the first and second embodiments, the oil level may be determined by either a sensor or a model, e.g. a computer model arranged to determine the oil level based on various input data.

In the first embodiment, whether the retarder is applied depends on the vehicle speed and the degree of desired deceleration, as well as the oil level around the differential. However, there may be no such limits of speed and desired deceleration, and instead application of the retarder may depend on only whether the oil level around the differential is sufficient, i.e. above the threshold level.

An oil level around a differential has been described above. In further embodiments an oil level around another type of transmission gear could be increased and decreased. For example, an oil level around a crown wheel or an oil level around a pinion meshing with a crown wheel could be raised or lowered.

In the above embodiments, the threshold level is a fixed level. However, in other embodiments, the threshold level may be variable, and various factors may be taken into account to define the instantaneous threshold level, including the torque to be applied, inclination of vehicle, history of the oil, oil temperature, air temperature, vehicle weight, total mileage of the axle parts, and the number of oil cycles between the rear axle 6 and the reservoir 22 which have occurred. In both embodiments, this allows the oil level below which an increase in the oil level is initiated to be tailored to the instantaneous conditions the vehicle is experiencing.

Thus, the oil temperature varies as the vehicle is used. If the oil is hot, it is thinner than when the oil is cold, and therefore its lubricating ability will be less. Therefore, when the oil is hot, more oil will be needed around the differential in order to provide the same level of lubrication, and so the instantaneous threshold oil level for hot oil will be higher than the instantaneous threshold oil level for cold oil.

The torque level being transmitted by the differential varies as the vehicle is used. When the differential transmits a high torque then more lubrication is required than when the differential is transmitting a low torque. Accordingly, when the instantaneous torque being transmitted by the differential is relatively high, then the instantaneous threshold oil level will be higher than when the instantaneous torque being transmitted by the differential is relatively low.

Although the two preceding examples have been described in relation to there being two instantaneous threshold oil levels (i.e. a high instantaneous threshold oil level and a low instantaneous threshold oil level), it will be apparent to the skilled person that there may be any number of instantaneous threshold oil levels for a particular parameter.

In the above examples of variable oil level threshold, the fact that the threshold is not fixed means that it can be ensured that the oil level around the differential when the retarder is applied is optimized for the instantaneous conditions the vehicle is experiencing. This reduces the likelihood of there being insufficient oil around the differential, which would result in greater wear of the differential, or there being excessive oil, which will result in power losses due to oil churning.

The vehicle may comprise a 3D-GPS system. The data provided includes road incline and curve radius up to 300 meters ahead of the vehicle. Both road incline and road curve radius affect the torque applied to the differential and therefore the amount of oil required around the differential. At an average vehicle speed of 108 kilometers per hour, on realization that there is a feature approaching that will require a higher oil level around the differential, a lead time of 300 m allows 10 seconds for the oil level to be increased in anticipation. However, different distances ahead may be used. In use, when the vehicle approaches an uphill incline and the calculated load and speed which will result from the incline indicates that the torque which will result will cause excessive wear of the differential unless the oil level around the differential is increased, the valve between the rear axle and the reservoir opens, to allow an increase in oil level around the differential. Similarly, if the vehicle is approaching a downhill incline, and it is calculated that, when the retarder is applied, the resulting torque in the differential will cause excessive wear of the differential unless the oil level around the differential is increased, the valve between the transmission and the reservoir opens, to allow an increase in oil level. In the same way, if the radius of a curve in the road ahead will require use of the retarder to produce a significant speed reduction, the valve between the transmission and the reservoir can be opened to allow an increase in oil level if the oil level around the differential will not be sufficient. Therefore, the oil level around the differential can be optimized before the vehicle reaches a feature indicated on the GPS that will result in an increase in torque in the differential.

The oil level can also be varied in relation to the cruise control settings. For example, if a target speed is input which is significantly slower or faster than the current speed of the vehicle, future deceleration or acceleration, respectively, will be predicted, and the oil level around the differential can be adjusted according to the torque which will result from that deceleration or acceleration.

The processor of the brake operating device can monitor the level and quality of the oil around the differential, and thus determine the amount of torque the differential can take without excessive damage or wear. This torque value can then be used for blending between friction braking and retarder braking to ensure maximum differential life by ensuring that the retarder is not applied if there is not sufficient oil around the differential and maximum friction brake pad life by ensuring the retarder is applied in preference to the friction brakes whenever the oil level is sufficient. Thus, if oil level is increasing, the maximum torque allowed will increase and the retarder can gradually be applied, such that the torque it produces never increases over the maximum torque allowed, thus avoiding damage or excessive wear of the differential.

The parameters used to determine the oil level which should be used within the rear axle can be divided into three types: basic information (e.g. wheel speed or torque in the differential); supporting (predictive) information; and protecting information (e.g. ABS activity). If some of the basic information is faulty or missing, the processor can stop relying on that information to provide details of a suitable threshold oil level, and instead open the valve between the rear axle and the reservoir to achieve the maximum oil level. If some of the predicting or protecting information is faulty or missing, the system can be set up to provide a reduced efficiency improvement. For example, rather than simply opening the valve to achieve the maximum oil level as in the case of missing basic information, the valve can be opened to achieve a minimum oil level which is greater than that previously used by, for example, one third the difference between the minimum and maximum level in the case of missing/faulty predicting information, and two thirds the difference between the minimum and maximum level in the case of missing/faulty protecting information.

Generally, the oil level in the rear axle of a vehicle may be minimized, unless one of the situations shown in Table 1 occurs, in which case the control valve is opened to stop the minimizing function and to allow oil level in the rear axle to increase.

TABLE 1

| Time frame of situation | Situation | Reason oil level needs to increase |
|---|---|---|
| Present situation | Lateral or longitudinal inclination values > threshold, for more than a threshold time | oil around the differential may not be in the correct location around the differential to provide adequate lubrication |
| | Air temperature outside the vehicle < a threshold low temperature | oil viscosity will be too high |
| | Air temperature outside the vehicle > a threshold high temperature | oil viscosity will be too low to provide adequate lubrication |
| | Oil temperature < a low threshold oil temperature | oil viscosity will be too high to guarantee return flow |
| | Oil temperature is > a high threshold oil temperature | oil viscosity is too low to provide adequate lubrication |
| Short term future | Friction brake(s) activated | will lead to an increase in the torque in the differential |
| | ABS/ESP becomes active | will lead to an increase in torque in the differential |
| | Retarder is activated | will lead to an increase in torque in the differential |
| | Longer braking maneuvers measured by vehicle speed and G-Sensor (as backup for the torque readings) | will lead to an increase in torque in the differential |
| | Gear is shifted down | will lead to an increase in torque in the differential |
| | Command given to vehicle to accelerate | will lead to an increase in torque in the differential |
| | Wheel speed between two wheels differs more than 5% | the differential will need lubrication |
| Long term future situation | Vehicle total weight is higher than x % | the torque will be permanently high |
| | Mileage of axle parts is > threshold | as a result of wear, the differential needs full lubrication |
| | Number of oil level operating cycles > threshold | system is worn |

In order to calibrate a G-sensor, G-sensor data for periods of time in which the vehicle is travelling at constant speed, without braking, are used. The G-sensor values during those periods are summed so that the total sample period is at least 20 min. Because the vehicle is travelling at a constant speed without the braking, it is assumed that the vehicle will be travelling along a horizontal road. As such, the actual G-loadings on the vehicle will average 1G absolute. If the average G-sensor value for this period of time is not 1G, then the G-sensor is assumed to be out of calibration and can be recalibrated accordingly.

When the vehicle has been standing for a significant period of time it can be assumed that the temperature of the oil in the rear axle is the same as the ambient temperature of the air. Typically, a vehicle may have an ambient air temperature sensor for controlling operation of the engine and may include an axle temperature sensor. If the axle temperature sensor fails, then it is possible to estimate the temperature of the oil in the rear axle as follows. Firstly, the system determines when the vehicle has been standing for a significant period of time, for example the system determines if the ignition system has been turned off for at least 8 hours. This being the case the system then assumes that, when the ignition is turned on and the engine is started, the oil temperature is at the same temperature as the air temperature, as determined by the air temperature sensor. It is possible to monitor the amount of power being transmitted to the rear wheels (power being function of torque×speed). Knowing the differential inefficiency, amount of oil around the differential, and amount of heat being radiated from the transmission oil, a computer model can estimate the instantaneous oil temperature as the vehicle is being used. When the vehicle is next stationary for a significant amount of time, the engine air temperature sensor can again be used to determine the actual oil temperature in the rear axle. As such, this computer model can be arranged to determine the oil temperature.

In some systems, greater efficiency will be achieved by using an analogue control for filling the rear axle with oil from the reservoir i.e. by providing interim positions of the control valve, rather than just open and closed, to control better the flow of the oil.

When oil is fed from a reservoir to the axle via gravity and is returned to the reservoir by oil splash coming from, for example the crown wheel, then the oil level in the reservoir can be modeled between the two extremes of the oil level (i.e. a maximum oil level (when the valve has been closed for a certain period of time) and a minimum oil level (when the valve has been open for a certain period of time)). The rate of filling the reservoir will be calculated as a function of the oil viscosity (estimated from oil temperature) and the speed of the crown wheel resulting in a predetermined amount of oil splash. The rate of emptying the reservoir will be calculated as a function, again, of the oil viscosity and also the valve position.

An oil quality model can be used to determine when the system requires maintenance. The oil temperature is measured and grouped in ranges. Every portion of time the axle spends in a temperature range is cumulated for that range. Each range is assigned a weighting factor, and the total time (adjusted using the weighting factors) is summed to get an indication of the aging of the oil as a result of temperature. When the oil is new it is better able to lubricate the differential and hence a relatively low oil level threshold can be provided, whereas when the oil is old it will have degraded and be less able to lubricate the differential and hence an oil level threshold will typically be higher.

A driver model can be created, on the basis of the driver's input rates on the brake pedal and the accelerator pedal (or, alternatively, the torque rates created), and the driver can be classified into one of three groups (sensitive, normal, aggressive).

All the parameters of oil level control can be varied on the basis of the driver classification and/or the oil quality model.

The torque transmitted by the differential can be modeled, where this information is missing from the engine management system, on the basis of the vehicle load, the incline of the vehicle, the brake pedal position and the vehicle speed. The torque value calculated can be used to control the oil level around the differential.

If, on a vehicle pulling away, there is a difference in right hand and left hand driven wheel speed, i.e. 5% for 2 seconds, thus indicating that one of the wheels is spinning, the electronic control unit can, by monitoring gear position, engine torque, vehicle inclination, clutch position and drive-shaft torque determine that the vehicle is attempting to pull away, and apply the differential lock to prevent the differential wheel speed and assist in the vehicle pulling away until a speed or time threshold is reached, at which point the differential lock is disengaged automatically.

Where one driven wheel may be on a lower coefficient surface (such as ice) and where another driven wheel may be on a high coefficient friction surface, such as dry tarmac, or whether the vehicle is on a hill with a low coefficient of friction, the transition between foot brake braking (four-wheel braking (e.g. friction braking)) and parking brake braking (i.e. two-wheel braking (e.g. transmission brake)), can be dangerous, as differential rear wheel movement can occur, leading to movement of the vehicle. Therefore, to overcome this problem, the differential lock can be automatically applied on parking to increase safety. The differential lock actuator can be self-locking.

In all the above embodiments, the oil level is discussed primarily in relation to the differential. However, the threshold oil level could be determined in relation to another transmission gear of the transmission, for example, the crown wheel or the crown wheel pinion. Further, the differential in the above embodiments is in the rear axle, but the transmission gear could be in any drive axle.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A braking apparatus for a vehicle,
the braking apparatus including
   a drive axle having a transmission gear around which an amount of oil for lubrication is variable,
   at least one friction brake, and
   at least one retarder, the retarder being capable of operating to slow the vehicle through the transmission gear,
the braking apparatus comprising:
   a brake operating device for operating the at least one friction brake and the least one retarder,
   wherein, the brake operating device, on operation by a user, is arranged to apply the at least one retarder when an oil level around the transmission gear is above a threshold level, and
   wherein, if the oil level is below the threshold level, the brake operating device is arranged to initiate an increase in the oil level around the transmission gear.

2. A braking apparatus for a vehicle,
the braking apparatus including
a drive axle having a transmission gear around which an amount of oil for lubrication is variable,
at least one friction brake, and
at least one retarder, the retarder being capable of operating to slow the vehicle through the transmission gear,
the braking apparatus comprising:
a brake operating device for operating the at least one friction brake and the at least one retarder, the brake operating device being operable by a user to generate a desired vehicle deceleration,
wherein,
   if the vehicle speed is above a threshold speed and a degree of vehicle deceleration desired is below a threshold degree,
   the brake operating device is arranged to apply the at least one retarder if an oil level around the transmission gear is above a threshold level, and the brake operating device is arranged to apply only the at least one friction brake if the oil level around the transmission gear is below the threshold level.

3. The braking apparatus according to claim 2, wherein, if the oil level around the transmission gear is below the threshold level, the brake operating device is further arranged to initiate an increase in the oil level around the transmission gear, and, when the oil level around the transmission gear is above the threshold level, the brake operating device is arranged to apply the retarder.

4. A braking apparatus for a vehicle,
the braking apparatus including
a drive axle having a transmission gear around which an amount of oil for lubrication is variable,
at least one friction brake, and
at least one retarder, the retarder being capable of operating to slow the vehicle through
the transmission gear,
the braking apparatus comprising:
a brake operating device, for operation of the at least one friction brake and the at least one retarder, the brake operating device being operable by a user to generate a desired vehicle deceleration, and
wherein, if a degree of desired vehicle deceleration generated by the user is below a threshold degree,
the brake operating device is arranged to initiate an increase in an oil level in the transmission gear on the brake operating device being operated by a user, and
the brake operating device is arranged to delay operation of the at least one retarder by a predetermined amount of time.

5. The braking apparatus according to claim 4, wherein the brake operating device is arranged to initiate an increase in the oil level in the transmission gear on the brake operating device being operated by a user only if the oil level around the transmission gear is below a threshold level.

6. The braking apparatus according to claim 1, further including
a reservoir for storing oil,
the reservoir being fluidly connected to the drive axle by a valve, the positioning of the reservoir in relation to the drive axle being such that, on opening of the valve, oil can flow from the reservoir into the drive axle under the influence of gravity, thereby increasing the oil level around the transmission gear.

7. The braking apparatus according to claim 1, further including
a reservoir for storing oil,
the reservoir being fluidly connected to the drive axle via a pump, the pump being arranged to pump oil from the reservoir to the drive axle, thereby increasing the oil level around the transmission gear.

8. The braking apparatus according to claim 1, further comprising a determining feature to determine the oil level around the transmission gear.

9. The braking apparatus according to claim 8, wherein the determining feature to determine oil level around the transmission gear is a sensor.

10. The braking apparatus according to claim 8, wherein the determining feature to determine oil level around the transmission gear is a model.

11. The braking apparatus according to claim 1, further including a defining feature for defining the threshold oil level, the threshold oil level being dependent on at least one of an instantaneous torque being transmitted by the transmission gear, an inclination of the vehicle, a history of the oil, an oil temperature, an air temperature, a vehicle weight, a total mileage of axle parts, and a number of oil level cycles.

12. The braking apparatus according to claim 1, wherein the brake operating device includes an input to be used by a user to input a desired vehicle deceleration, and wherein the input is a brake pedal.

13. The braking apparatus according to claim 1, wherein the transmission gear is one of the group comprising a crown wheel, a crown wheel pinion, and a differential gear.

14. A vehicle including:
a drive axle configured to drive a pair of laterally spaced wheels and having a transmission gear around which an amount of oil for lubrication is variable,
at least one friction brake for each wheel, and
at least one retarder, the retarder being capable of operating to slow the vehicle through the transmission gear,
a braking apparatus comprising
a brake operating device for operating the at least one friction brake and the least one retarder
wherein, the brake operating device, on operation by a user, is arranged to apply the at least one retarder when an oil level around the transmission gear is above a threshold level, and
wherein, if the oil level is below the threshold level, the brake operating device is arranged to initiate an increase in the oil level around the transmission gear.

* * * * *